United States Patent Office 3,115,516
Patented Dec. 24, 1963

3,115,516
N,N-DICHLORO- AND N,N-DIBROMO-β-AMINO-PROPIONITRILE, AND PROCESSES OF PREPARING THEM AND THEIR DERIVATIVES
Elmore Louis Martin, Wilmington, Del., assignor to E. I. du Pont de Nemours and Company, Wilmington, Del., a corporation of Delaware
No Drawing. Filed Oct. 20, 1960, Ser. No. 63,723
7 Claims. (Cl. 260—465.5)

This invention relates to a process for preparing nitriles and their halogenated derivatives and, further, to a novel class of nitriles obtained from said process. More particularly, the invention has one of its objects the provision of a process for preparing open-chain nitriles having three carbon atoms and their chlorine and bromine-bearing derivatives. A further object of the invention is the provision of a novel class of chloro- and bromo-nitriles.

Nitriles form a broad class of organic compounds which find uses in many fields of industry. A 3-carbon nitrile, malononitrile, is a well known and valuable reagent for preparing a wide range of organic compounds. Chlorinated malononitrile, i.e., dichloromalononitrile, is useful as an insecticide and the corresponding bromine derivative, dibromomalononitrile, is useful as an intermediate in the preparation of tetracyanoethylene. Tetracyanoethylene is a recently discovered and valuable cyanocarbon from which a new class of dyes is obtained. A need exists for an economical process for preparing halogenated nitriles, particularly chlorinated and brominated malononitriles, from readily available materials.

It has now been found that reaction of β-aminopropionitrile with a halogen of atomic number 17–35, inclusive, in the presence of an acid acceptor yields one or more of the following nitriles: Malononitrile

(CNCH₂CN), dihalomalononitrile (NCCX₂CN) and N,N-dihalo-β-aminopropionitrile (X₂NCH₂CH₂CN), where the halogen (X) is of atomic number 17–35, i.e., chlorine or bromine. The products most readily obtained in high yields by the process of the invention are the dihalomalononitriles and the N,N-dihalo-β-aminopropionitriles.

The N,N-dihalo-β-aminopropionitriles are new compounds whose individual formulas are Cl₂NCH₂CH₂CN and Br₂NCH₂CH₂CN. These compounds tend to decompose when warmed, particularly to temperatures above about 90° C., and they are preferably stored at temperatures below about 10° C. They are reactive and will, when warmed, combine with chlorine or bromine in the presence of an acid acceptor to form dichloromalononitrile or dibromomalononitrile. The use of N,N-dihalo-β-amino-propionitriles in place of β-aminopropionitrile as a starting reagent in the preparation of dihalomalononitriles and malononitrile represents an optional mode of operation which is included within the scope of the invention.

The halogens employed as one of the reactants are well known commercially available products which can be used, as marketed, in the process without special purification. The second reactant, β-aminopropionitrile, is available commercially or it can be prepared readily from acrylonitrile and ammonia [see, e.g., Horning, Organic Synthesis, coll. vol. III, p. 93, Wiley (1955)].

Any acid acceptor can be used which will react with the hydrochloric or hydrobromic acid by-products of the process (HX, X being as defined above). Any acceptor for hydrochloric acid will also be a suitable acceptor for hydrogen bromide and vice versa. For obvious economic reasons, the cheapest acceptors are usually employed, such as inorganic carbonates, oxides, hydroxides, and the like. Suitable acceptors are powdered limestone, magnesium carbonate, soda ash, sodium bicarbonate, barium carbonate and similar products. Organic acid acceptors, e.g., pyridine, tributylamine, tricyclohexylamine, basic ion-exchange resins and the like, can be employed either alone or in combination with inorganic acid acceptors. The acid acceptor can be soluble or insoluble in the reaction mixture, i.e., solubility is not a critical factor. It is preferred that the acid acceptor, if it is insoluble, be used in finely divided form to permit maximum rate of reaction.

The reaction can be conducted, if desired, in the presence of an inert liquid medium. The use of a liquid medium offers advantages in maintaining good contact between the reactants and facilitates removing the contents from the reaction vessel. Operation of the process in an inert liquid medium, therefore, represents a preferred procedure. However, a liquid medium is not an essential component of the reaction. Classes of operable inert liquids include alkanes, cycloalkanes, aromatic hydrocarbons and halogenated hydrocarbons. Specific examples of liquids which can be used are hexane, cyclohexane, benzene, toluene, chloroform, carbon tetrachloride, and the like. The operable liquids are not limited to the above classes of compounds, which are given solely for purposes of illustration. The liquid medium is preferably, although not necessarily, a solvent for β-aminopropionitrile.

The reaction can be conducted by either a batch or continuous flow process. In either process, the reaction vessel is preferably made of material which is resistant to chemical attack by halogens or by halogen acids. Materials such as glass, stainless steel, platinum, ceramics and the like are suitable. The vessel is generally equipped (1) with means for controlling the feed rate of the reactants, (2) with a condenser to permit refluxing of the reaction mixture and to prevent the loss of desirable products, (3) with means for agitating the reactants, and (4) with means for heating and cooling the reaction mixture. The reaction is normally conducted at atmospheric pressure and pressure-resistant vessels need not be employed.

The order in which the reactants are charged into the vessel is not critical. Conveniently, the acid acceptor and liquid medium are charged into the reaction vessel and stirred to form a suspension. The β-aminopropionitrile is then added, stirred into the suspension and the halogen is added gradually to the mixture. Optionally, the acid acceptor, liquid medium and halogen can be charged into the vessel and the β-amino-propionitrile added gradually to this mixture. In still another procedure, the halogen and β-aminopropionitrile can be added simultaneously through individual inlets to the suspension of acid acceptor and liquid medium.

The temperature of the reaction is kept as low as operability permits. Generally, the reactants are cooled initially to about 10° C. until all the components have been brought into contact and the mixture is then heated slowly while being agitated. A low temperature is used initially solely as a convenient means for handling the halogen reactant. The temperature employed is not critical and it will generally lie between about −20° and 350° C. A preferred temperature range lies between about −10° and about 250° C. Heating of the reaction mixture can be accomplished by conventional methods.

All of the nitriles described earlier are obtained in the process under the temperature conditions which have been discussed but the ratio in which they are present in the final product is controlled partially by the temperature and by the quantity of halogen employed in the process. Thus, to obtain a reaction product containing a substantial proportion of N,N,-dihalo-β-aminopropionitrile a reaction temperature of about −20° to +30° C. is generally used. To obtain a reaction product containing a substantial proportion of dihalomalononitrile, a temperature of about 70°–150° C. is preferred. Normally a temperature of at most 120° C. is satisfactory. To obtain malononitrile as a substantial component of the reaction product, a temperature of about 200°–350° C. is used; and preferably, although this is not essential, the passing of halogen into the reaction mixture is ceased at about 20° to 30° C. Generally a temperature of not over 250° C. is satisfactory for production of malononitrile.

The pressure employed in the reaction is not critical. It can be atmospheric, superatmospheric or subatmospheric. No major advantage is gained by using superatmospheric pressures or subatmospheric pressures and, as a matter of convenience and low cost of operation, the reaction is normally conducted at atmospheric pressure.

The reaction proceeds rapidly and the reaction time is not a critical factor. Generally, in a batch process the reaction time will lie between about 15 minutes and about 48 hours depending upon the temperature employed. A preferred time will be between about 1 hour and 16 hours. During the reaction period the contents of the reaction vessel are preferably mixed, for example, by mechanical stirring or shaking.

The process of the invention can be conducted by a continuous flow method wherein the halogen and β-aminopropionitrile are passed into a reaction tube containing an acid acceptor which is maintained at a temperature which will yield the desired product. Generally, the contact or reaction times are much lower in a continuous flow process than in a batch process and the reaction time can, in fact, be as short as a few seconds. The temperatures employed in a continuous process are usually higher than those used in a corresponding batch process, the particular temperature depending upon the contact time used. The maximum temperature in a continuous process preferably does not exceed 350° C.

The reactants need not be used in any particular molar ratio. For economic reasons the halogen is normally used in excess although this is not necessary for operability. The ratio, moles halogen/moles β-aminopropionitrile, will usually lie between about 0.2 and 50; a preferred ratio lies between about 0.5 and 20.

The acid acceptor is used to remove by-product hydrogen halide from the reaction zone. The quantity of acceptor which is employed is not critical as far as operability is concerned since the desired nitriles are formed to some extent even if the acid acceptor is present in only small quantities. However, for maximum yield of nitriles and also for economic reasons it is preferable to use sufficient acid acceptor to react with most of the hydrogen halide formed in the reaction. The ratio, moles acid acceptor/moles halogen, will generally lie betwen about 0.3 and about 10.0.

The products of the reaction are collected and purified by conventional procedures. In one procedure, the reaction mixture is filtered to remove insoluble material. If water is employed as a solvent, two liquid phases are normally present. These phases are separated and the aqueous phase is extracted with a halogenated hydrocarbon, e.g., chloroform, methylene chloride, tetrachloroethane, and the like. The extracts and nonaqueous phase are combined and dried over conventional drying agents. The volatile material is removed by conventional means, e.g., evaporation, distillation, etc. The products can be further purified, if desired, by distillation under reduced pressure, by crystallization or by other well known procedures.

The new compounds obtained by the process, as stated previously, have the general formula $X_2NCH_2CH_2CN$, where X is chlorine or bromine. The chlorine compound, i.e., $Cl_2NCH_2CH_2CN$, is a light yellow oily liquid. The bromine compound, i.e., $Br_2NCH_2CH_2CN$, is an orange solid which melts at 38–40° C. Both products have disagreeable penetrating odors. They are soluble in many conventional organic solvents, e.g., halogenated hydrocarbons, ethers, ketones, esters and N,N-dialkylformamides. The compounds dissolve, for example, in chloroform, carbon tetrachloride, tetrachloroethane, diethyl ether, methyl ethyl ketone, ethyl acetate, dimethyl formamide, and related solvents. The new compounds are substantially insoluble in water and they have only limited solubility in saturated hydrocarbons, e.g., petroleum ether and cyclohexane. They have somewhat greater solubility in aromatic hydrocarbons. The new compounds have a density greater than 1.0.

The N,N-dihalo-β-aminopropionitriles decompose rapidly when heated to steam bath temperatures, i.e., to about 90–100° C. N,N-dichloro-β-aminopropionitrile is fairly stable at normal atmospheric temperatures and the compound can be stored in conventional containers. N,N-dibromo-β-aminopropionitrile is less stable than the chloro-compound and the bromo-compound is preferably stored in a cold room or refrigerator at about 10° C. or less. The bromo-compound is sufficiently stable at atmospheric temperatures for use in reactions. Both compounds are reactive materials which are useful as intermediates in the preparation of valuable compounds. They can, for example, be employed as reactants in the process, as described in Example VII below, to form dichloro- and dibromomalononitriles. The latter compounds are reacted with copper powder as described in U.S. 2,794,824 to form tetracyanoethylene, a compound which is a precursor in the preparation of fungicides, dyes and other valuable products (see, for example, U.S. 2,788,356 and 2,889,335).

The N,N-dihalo-β-aminopropionitriles are also useful as chlorinating and brominating agents. To illustrate, N,N-dibromo-β-aminopropionitrile reacts with N,N-dimethylaniline in methylene chloride solution to give p-bromo-N,N-dimethylaniline, M.P. 55–56° C.

The process of the invention and the new compounds obtained thereby are illustrated more fully in the following examples which were carried out at atmospheric pressure except where otherwise indicated.

*Example I*

A glass reaction vessel is employed which is equipped with a reflux condenser, a dropping funnel and a mechanically-driven stirrer. The vessel is charged with 225 ml. of water and 110 g. of powdered calcium carbonate. The mixture is stirred and 200 g. of liquid bromine is added gradually. The reaction vessel is placed in an ice bath and the mixture is cooled with stirring to about 5° C. The mixture is kept at this temperature and a solution of 21 g. of β-aminopropionitrile in 75 ml. of water is added dropwise with vigorous stirring. When addition is complete, the reaction mixture is heated to 80–85° C. for a period of 20 minutes. It is then cooled to about 25° C. and it is shaken three times with 75 ml. portions of methylene chloride. The methylene chloride extracts are combined, dried with anhydrous magnesium sulfate and filtered. The filtrate is evaporated to remove methylene chloride and the liquid residue is distilled at reduced pressure to yield 37 g. (55% yield) of dibromomalononitrile, B.P. 43–45° C./4 mm. Hg pressure.

*Example II*

A reaction vessel of the type described in Example VI below is charged with 75 ml. of water, 3 drops (about 0.12 g.) of pyridine, 33 g. of powdered calcium carbonate and 64 g. of bromine. The mixture is stirred and cooled to about 5° C. A solution of 7 g. of β-aminopropionitrile in 25 ml. of water is then added dropwise with stirring to the mixture over a period of about 10 minutes, the temperature of the reaction being maintained at 4–5° C. After addition is complete the temperature of the mixture is raised to 80° C. and the temperature is held at this point for 25 minutes. The mixture is then cooled to 25° C. and it is extracted with three 75-ml. portions of methylene chloride. The combined extracts are processed as described in Example I to yield 10.5 g. of dibromomalonitrile (yield, 47%), boiling at 37° C. under 3 mm. Hg pressure.

Example III

A reaction vessel of the type described in Example VI below is charged with 7.0 g. of β-aminopropionitrile, 100 ml. of water, 30 g. of powdered calcium carbonate and 5 drops (about 0.20 g.) of pyridine. The mixture is stirred vigorously and 64 g. of bromine is added dropwise to it while maintaining the temperature at 25–30° C. by means of external cooling. The mixture is stirred 4 hours at 25° C. and the temperature is then raised gradually to 75° C. A slight exothermic reaction occurs and the temperature rises to 79° C. After about 5 minutes at this temperature the color due to excess bromine is gone. The mixture is then cooled to 25° C. and filtered to remove excess calcium carbonate. The filtrate is extracted with three 75-ml. portions of methylene chloride. The combined extracts are processed as described in Example I to yield 6 g. of dibromomalononitrile boiling at 70° C. under 28 mm. Hg pressure.

Example IV

A reaction vessel of the type described in Example VI below is charged with 225 ml. of water and 110 g. of calcium carbonate. The mixture is stirred and 200 g. of bromine, 150 ml. of carbon tetrachloride and 0.3 ml. of pyridine are added. The mixture is cooled to about 5° C. and a solution of 21 g. of β-aminopropionitrile in 75 ml. of water is added dropwise over a period of 0.5 hour. The reaction mixture is then heated to refluxing temperature for 4 hours. The temperature, which initially was 63° C. increased to 77° C. during this period. The mixture is cooled to 25° C. and the organic layer which forms is separated. The aqueous layer is extracted three times with 75-ml. portions of methylene chloride. The extracts and previously separated organic layer are combined into one solution which is dried over anhydrous magnesium sulfate. The dried solution is processed as described in Example I to yield 37 g. of dibromomalononitrile, boiling at 43–45° C./4 mm. Hg pressure.

Examples I, II, III and IV illustrate the process of the invention employing β-aminopropionitrile as a reagent to yield dibromomalononitrile. By using chlorine in place of bromine in the process as described in the preceding examples, dichloromalononitrile is obtained in good yield from β-aminopropionitrile.

Example V

A glass reaction vessel is employed which is equipped with a reflux condenser, a gas inlet tube and a mechanically driven stirrer. The vessel is charged with 100 ml. of water and 12 g. of powdered calcium carbonate. This mixture is agitated to form a suspension and 7 g. of β-aminopropionitrile is added. The mixture is cooled to about 0° C. by immersing the reaction vessel in ice and 18 g. of chlorine gas is passed in with vigorous stirring at this low temperature. After addition of chlorine gas is completed, the mixture is agitated for 10 minutes following which 75 ml. of methylene chloride is added and agitation is continued for 15 minutes. The organic layer is separated and the remaining aqueous layer is extracted with two 50-ml. portions of methylene chloride. The organic layer and the extracts are combined and dried over anhydrous magnesium sulfate. The dried solution is filtered and the filtrate is evaporated at about 5° C. and 0.5 mm. Hg pressure and to remove the solvent. There remains 13 g. of N,N-dichloro-β-aminopropionitrile, a pale yellow oil that congeals at −40° C. and melts between −35° and −38° C. The identity of the compound, which has the formula $Cl_2NCH_2CH_2CN$, is confirmed by elemental analysis.

*Analysis.*—Calc'd for $C_3H_4N_2Cl_2$: C, 25.92; H, 2.90; N, 20.16; Cl, 51.02. Found: C, 26.02; H, 2.97; N, 19.08; Cl, 50.63.

Example VI

A glass reaction vessel is employed which is equipped with a reflux condenser, a dropping funnel and a mechanically-driven stirrer. The vessel is charged with 100 ml. of water, 11 g. of powdered calcium carbonate and 33 g. of liquid bromine. The mixture is stirred and it is cooled to about 5° C. by immersing the vessel in an ice bath. A solution of 7 g. of β-aminopropionitrile in 20 ml. of water is then added dropwise over a period of about 5 minutes to the mixture which is stirred and maintained at the low temperature. The reaction mixture is stirred for an additional 10 minutes, 50 ml. of methylene chloride is added and the mixture is agitated again for 5 minutes. The organic layer is separated and the aqueous layer is extracted with two 50-ml. portions of methylene chloride. The organic layer and the methylene chloride extracts are combined, dried over anhydrous magnesium sulfate and then filtered. The filtrate is evaporated under reduced pressure in a liquid bath maintained at a low temperature, i.e., at about 10° C. There is obtained 22.5 g. (99% yield) of N,N-dibromo-β-aminopropionitrile, an orange solid of the formula $Br_2NCH_2CH_2CN$. The compound is crystallized from an ethyl ether-petroleum ether mixture to form orange plates melting at 38–40° C. The identity of the compound is confirmed by elemental analysis.

*Analysis.*—Calc'd for $C_3H_4Br_2N_2$: C, 15.81; H, 1.77; N, 12.30; Br, 70.13. Found: C, 15.36; H, 2.04; N, 11.15; Br, 70.07.

The compound decomposes vigorously when heated in an open glass tube at steam bath temperatures.

Examples V and VI illustrate the process of the invention employing β-aminopropionitrile to prepare N,N-dihalo-β-aminopropionitriles.

Example VII (A) A reaction vessel equipped with a dropping funnel, a downward condenser, an inlet gas tube and mechanical agitator is charged with 100 ml. of water and 20 g. of calcium carbonate. The mixture is stirred and it is heated to gentle reflux (about 100° C.). Chlorine gas is passed into the mixture and at the same time 13.9 g. of N,N-dichloro-β-aminopropionitrile (prepared as described in Example V) is added dropwise over a period of about 30 minutes. Volatile material passes through the condenser and a light yellow oil separates from the distillate which is collected in a receiver connected to the condenser. The entire distillate is extracted three times with methylene chloride and the combined extracts are dried with anhydrous magnesium sulfate. The dried extract is filtered and solvent is removed from the filtrate by heating it at 80° C. The liquid residue is distilled at 30 mm. pressure from a bath heated to 80° C. The distillate is heated further for a brief period on a steam bath to yield 1.5 g. of dichloromalononitrile, a compound of the formula $CNCCl_2CN$.

(B) The experiment of part A is repeated employing three times the quantities of reactants. There is obtained 3.0 g. of $CNCCl_2CN$, boiling at 94–95° C.

The process of Example VII can be used to prepare dibromomalononitrile from bromine and N,N-dibromo-β-aminopropionitrile (obtained as described in Example VI). In the process liquid bromine can be dropped onto the reaction mixture or bromine vapors can be passed into the mixture.

Example VII illustrates the process of the invention employing N,N-dihalo-β-aminopropionitriles for preparing dihalomalononitriles.

Example VIII

A solution of 13.9 g. of N,N-dichloro-β-amino-propionitrile (prepared as described in Example V) in 162 g.

of carbon tetrachloride is passed at a rate of 1 ml./3 minutes into a tube packed with activated carbon which is maintained at a temperature of 230–240° C. The condensate, which is collected in a receiver, is a solution of malononitrile. A portion of the condensate is mixed with a solution of benzoquinone in alcohol and a drop of $NH_4OH$ is added to the mixture. A deep blue color forms, demonstrating that malononitrile is present [Kesting, Ber. 62, 142 (1939)].

Malononitrile can be isolated in solid form, if desired, by conventional methods, e.g., evaporation of the solution and crystallization of the residue.

The product mixture obtained as illustrated in Example V (preparation of N,N-dichloro-β-aminopropionitrile) or in Example VI (preparation of N,N-dibromo-β-aminopropionitrile) can be heated directly to the desired temperature of about 225–250° C. for a short period to obtain malononitrile.

Example VIII, alone or in combination with Examples V or VI, illustrates the preparation of malononitrile by the process of the invention.

Since obvious modifications and equivalents will be evident to those skilled in the chemical arts, I propose to be bound solely by the appended claims.

The embodiments of the invention in which an exclusive property or privilege is claimed are defined as follows:

1. The process of preparing malononitrile, $NCCX_2CN$ and $X_2NCH_2CH_2CN$, wherein the X's are the same and each is a halogen of atomic number 17–35, which comprises contacting a halogen of atomic number 17–35 (X) with β-aminopropionitrile at a temperature between about —20° and 350° C. in the presence of an acid acceptor which is reactive with by-product HX.

2. The process of preparing dichloromalononitrile which comprises contacting chlorine and a member selected from the group consisting of β-aminopropionitrile and N,N-dichloro-β-aminopropionitrile, at a temperature of about 70° to 150° C. in the presence of an acid acceptor which is reactive with hydrochloride acid.

3. The process of preparing dibromomalononitrile which comprises contacting bromine and a member selected from the group consisting of β-aminopropionitrile and N,N-dibromo-β-aminopropionitrile, at a temperature of about 70° to 150° C. in the presence of an acid acceptor which is reactive with hydrobromic acid.

4. The process of claim 2 wherein chlorine is contacted with N,N-dichloro-β-aminopropionitrile.

5. The process of claim 3 wherein bromine is contacted with N,N-dibromo-β-aminopropiontrile.

6. N,N-dibromo-β-aminopropionitrile.

7. N,N-dichloro-β-aminopropionitrile.

References Cited in the file of this patent

UNITED STATES PATENTS 2,808,439   Barrett et al. _____ Oct. 1, 1957

OTHER REFERENCES

Sidgwick: "The Organic Chemistry of Nitrogen," 1945, page 18.

Migrdichian, V.: The Chemistry of Organic Cyanogen Compounds, New York, Reinhold, 1947, pages 101–102.

Beilstein: Handbuch der Organischen Chemie, Berlin, Springer-Verlag, 1942, pages 537 and 539.